(12) United States Patent
Marupaduga

(10) Patent No.: US 12,028,919 B2
(45) Date of Patent: *Jul. 2, 2024

(54) METHOD AND SYSTEMS TO OPTIMIZE THE TARGET EN-DC NODE SELECTION FOR AN EXTENDED 5GNR COVERAGE

(71) Applicant: T-MOBILE INNOVATIONS LLC, Overland Park, KS (US)

(72) Inventor: Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,768

(22) Filed: Feb. 22, 2023

(65) Prior Publication Data

US 2023/0209633 A1  Jun. 29, 2023

Related U.S. Application Data

(63) Continuation of application No. 17/241,133, filed on Apr. 27, 2021, now Pat. No. 11,665,763.

(51) Int. Cl.
*H04W 24/10* (2009.01)
*H04B 17/318* (2015.01)
*H04W 76/16* (2018.01)

(52) U.S. Cl.
CPC .......... *H04W 76/16* (2018.02); *H04B 17/318* (2015.01); *H04W 24/10* (2013.01)

(58) Field of Classification Search
CPC ..... H04W 76/16; H04W 24/10; H04B 17/318
See application file for complete search history.

(56) References Cited

U.S. PATENT DOCUMENTS

2016/0099791 A1* 4/2016 Cui ................. H04B 7/024
                                                370/329
2022/0110175 A1* 4/2022 Marupaduga ....... H04W 52/367

* cited by examiner

*Primary Examiner* — Chuong A Ngo
(74) *Attorney, Agent, or Firm* — Shook, Hardy & Bacon L.L.P.

(57) ABSTRACT

Systems and methods are provided for extending coverage of a telecommunication network includes a user device and a cell site. The cell site includes a node management system communicatively coupled to the user device. The node management system is structured to receive one or more signal strengths associated with one or more target nodes, determine the one or more signal strengths are within a delta range threshold, determine one or more multi-technology thresholds associated with the one or more target nodes, determine a lowest multi-technology threshold based on the one or more multi-technology thresholds, and assign the user device to the one or more target nodes associated with the lowest multi-technology threshold determined.

20 Claims, 5 Drawing Sheets

METHOD AND SYSTEMS TO OPTIMIZE
THE TARGET EN-DC NODE SELECTION
FOR AN EXTENDED 5GNR COVERAGE

This application is a continuation of U.S. patent application Ser. No. 17/241,133, filed Apr. 27, 2021, and entitled method and systems to optimize the target EN-DC node selection for an extended 5GNR coverage, the entirety of which is hereby incorporated by reference.

SUMMARY

The present disclosure is directed, in part, to extending coverage of a telecommunication network, substantially as shown in and/or described in connection with at least one of the figures, and as set forth more completely in the claims.

In aspects set forth herein, the signal strength(s) associated with one or more target nodes are received. Typically, a user device is assigned to a target node based on the signal strength. As the user device operates in a mobile state (e.g., moves across a telecommunications network) and reaches the edge of a target node, the user device is re-assigned to a different target node. However, here, a user device is assigned to the target node based on the magnitude of a multi-technology threshold (e.g., B1 threshold), which increases the geographic area in which the user device may operate in a mobile state, reducing the need for a hand-off event (e.g., an event that re-initializes or otherwise identifies another target node, cell site, etc., to which the user device is re-assigned).

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
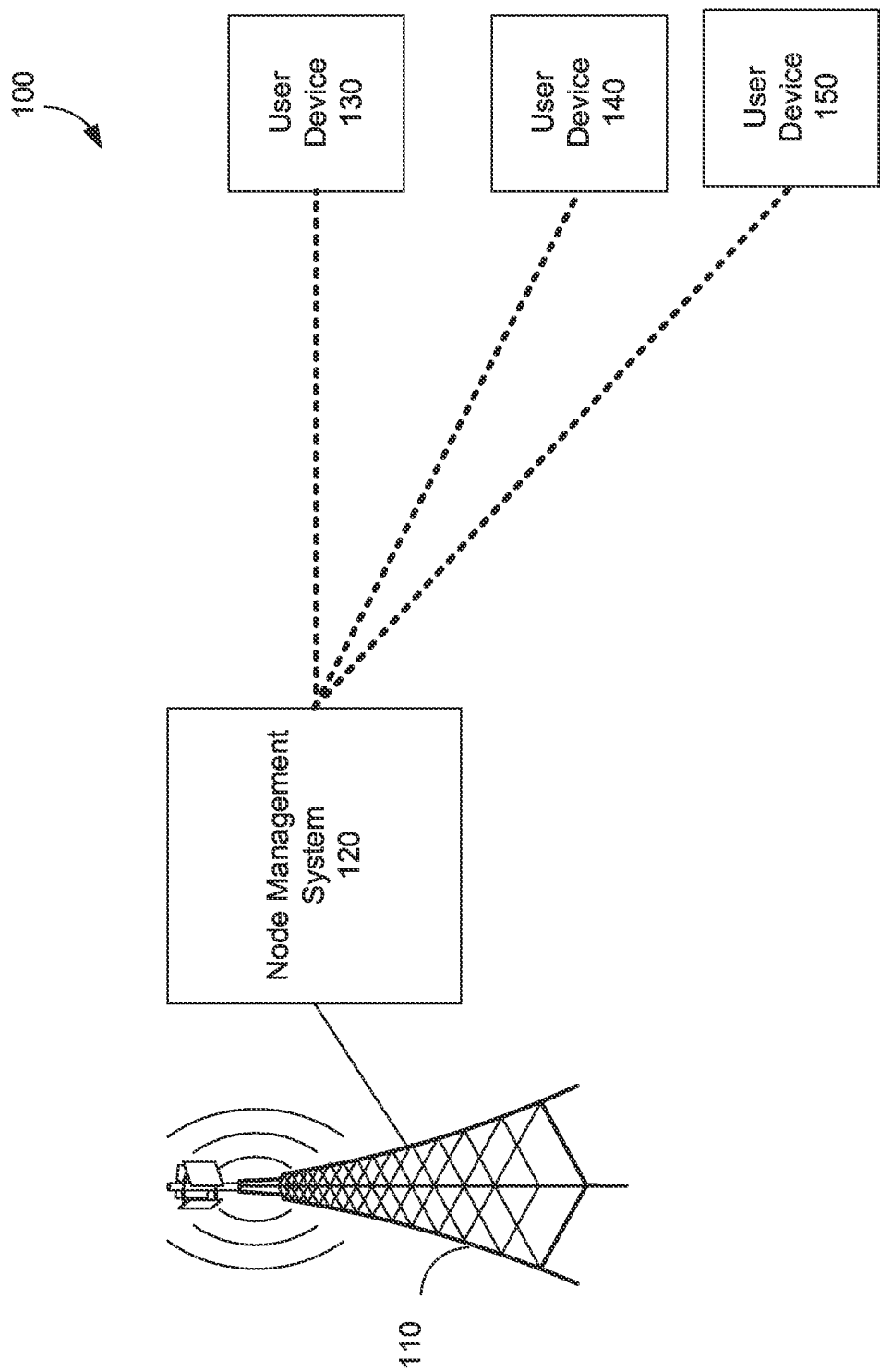
FIG. 1 depicts an example of a network environment in accordance with one or more embodiments.

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In certain aspects, methods are provided for extending coverage of a telecommunication network (e.g., a 5G New Radio network or any other suitable network). A determination is made that the strength of the signal(s) associated with the target node(s) are within a delta range threshold. A multi-technology threshold is determined for the target node(s) associated with signal strength(s) within the delta range threshold. The user device is assigned to the target node based on the magnitude of the multi-technology threshold, which increases the geographic area in which the user device may operate in a mobile state.

Advantageously, providing methods and systems for extending the coverage of a telecommunication network (e.g., a 5G NR network) by assigning the user device to a target node based on the magnitude of the multi-technology threshold increases the geographic area in which the user device may operate in a mobile state without the need for a handoff event, re-initialization of target node selection, or disruption.

In one aspect, a method is provided for extending the coverage of a telecommunication network. The method includes receiving, by a node management system communicatively coupled to a user device, one or more signal strengths associated with one or more target nodes. The method also includes determining the one or more signal strengths are within a delta range threshold. The method further includes determining one or more multi-technology thresholds associated with the one or more target nodes. The method further includes determining a lowest multi-technology threshold based on the one or more multi-technology thresholds. The method further includes assigning the user device to the target node associated with the lowest multi-technology threshold determined.

In another aspect, a computer-readable storage media having computer-executable instructions embodied thereon is provided that, when executed by one or more processors, cause the processors to perform various steps. The processors are caused to receive, by a first cell site comprising a node management system communicatively coupled to a user device, one or more signal strengths associated with one or more target nodes, the one or more target nodes corresponding to one or more secondary cell sites. The processors are also caused to determine, by the node management system, the one or more signal strengths are within a delta range threshold. The processors are further caused to determine one or more multi-technology thresholds associated with the one or more target nodes. The processors are further caused to determine a lowest multi-technology threshold based on the one or more multi-technology thresholds. The processors are further caused to assign the user device to the one or more target nodes associated with the lowest multi-technology threshold determined.

In yet another aspect, a system is provided for extending coverage of a telecommunication network. The system includes a user device and a cell site comprising a node management system communicatively coupled to the user device. The node management system receives one or more signal strengths associated with one or more target nodes. The node management system also determines the one or more signal strengths within a delta range threshold. The node management system further determines one or more multi-technology thresholds associated with the one or more target nodes. The node management system further determines a lowest multi-technology threshold based on the one or more multi-technology thresholds. The node management system further assigns the user device to the one or more target nodes associated with the lowest multi-technology threshold determined.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 500 shown in FIG. 5. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

The terms "user equipment," "UE," and "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 provides service to one or more user devices 130, 140, and 150. In some embodiments, the network environment 100 may be a telecommunication network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. Those devices and components may provide connectivity in a variety of implementations. In addition the network environment 100 may be utilized in a variety of manners, such as a single network, multiple networks, or as a network of networks, but, ultimately, is shown as simplified as possible to avoid the risk of confusing other aspects of the present disclosure.

The network environment 100 may include or otherwise may be accessible through a cell site 110. The cell site 110 may include one or more antennas, base transmitter stations, radios, transmitter/receivers, digital signal processors, control electronics, GPS equipment, power cabinets or power supply, base stations, charging stations, etc. such that the cell site 110 may provide a communication link between the one or more user devices 130, 140, and 150 and other components, systems, equipment, and/or devices of the network environment 100. The base station and/or a computing device (e.g., whether local or remote) associated with the base station may manage or otherwise control the operations of components of the cell site 110.

In some embodiments, the cell site 110 may be operable in a non-stand alone mode. In the non-stand alone (NSA) mode the network environment 100 may take the form of, for example, an E-UTRAN New Radio-Dual Connectivity (EN-DC) network. In an EN-DC network, a user device (e.g., the user device 130, 140, and/or 150) may connect to or otherwise access a 4G, LTE, 5G, or any other suitable network simultaneously. In the stand alone mode, the network environment 100 may take the form of a 5G network or any other suitable network.

In some embodiments, the network environment 100 may include a node management system (e.g., the node management system 120). The node management system may include one or more nodes (e.g., one or more master nodes) communicatively coupled to the user device(s) 130, 140, and/or 150 such that the node management system may be structured to transmit to and receive requests and/or data from one or more user devices. The one or more nodes may include an Evolved Node B (e.g., eNodeB or eNB), a Next Generation Node B (e.g., gNodeB or gNB), a combination thereof, or any other suitable node structured to communicatively couple to the user device(s) 130, 140, and/or 150.

In some embodiments, the user device 130, 140, and/or 150 may take the form of a wireless or mobile device capable of communication via the network environment 100. For example, the user device 130 may take the form of a mobile device capable of communication via a telecommunication network such as, but not limited to, a wireless telecommunication network. In this regard, the user device may be any mobile computing device that communicates by way of a network, for example, a 3G, CDMA, 4G, LTE, WiMAX, 5G or any other type of network.

In some embodiments, the network environment 100 may be structured to connect subscribers to a service provider or a plurality of service providers. Alternatively or additionally, the network environment 100 may be associated with a specific telecommunication provider that provides services (e.g. LTE, voice, location, etc.) to one or more user devices 130, 140, and/or 150. For example, the user devices 130, 140, and 150 may be subscribers to a telecommunication service provider, in which the user devices 130, 140, and 150 are registered or subscribed to receive voice and data services over the network environment 100. The network environment 100 may include any communication network providing voice and/or data service(s), such as, for example, a 1× circuit voice, a 3G network (e.g., CDMA, CDMA 2000, WCDMA, GSM, UMTS, a 4G network (LTE, WiMAX, HSDPA), or a 5G network.

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2:
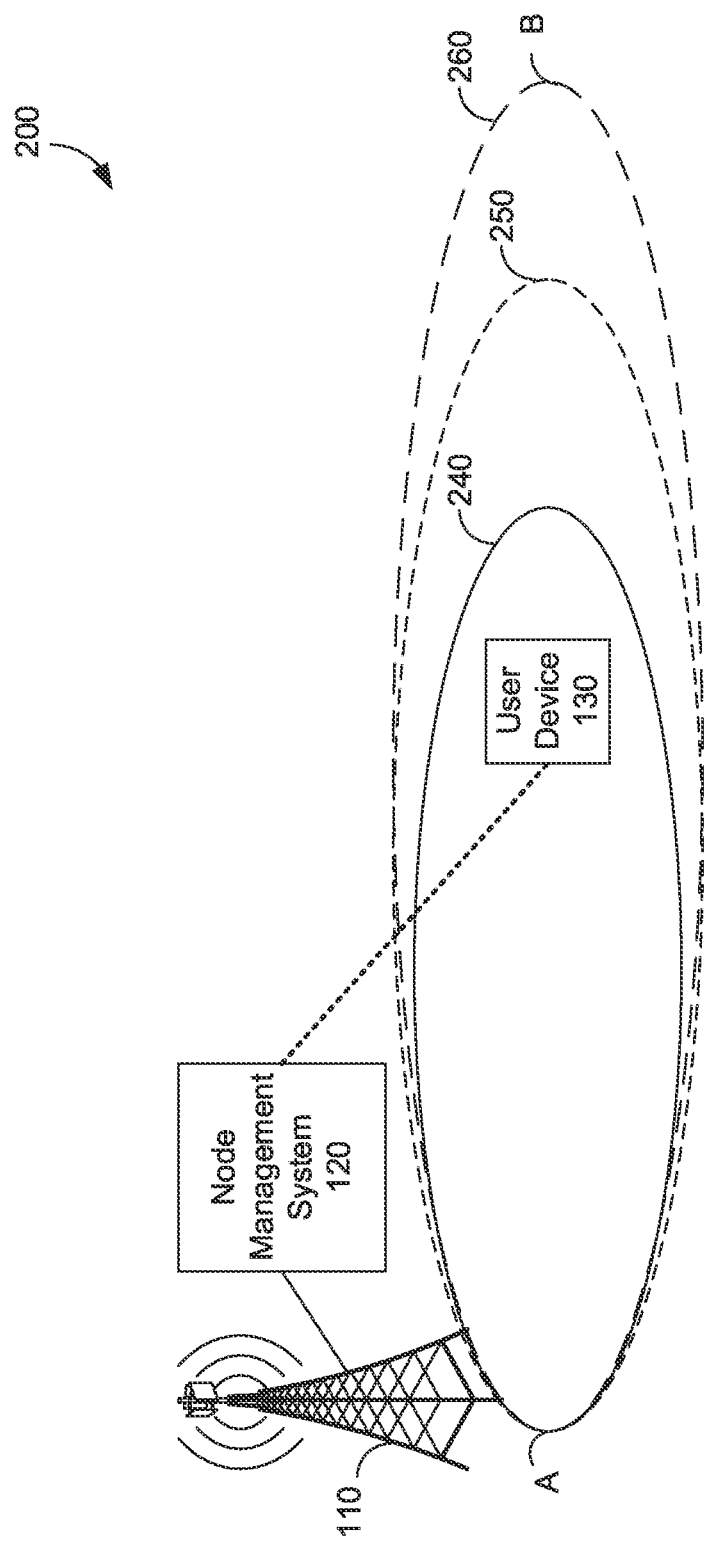
FIG. 2 is a diagram of a network environment including a cell site and node management system in accordance with an example embodiment.

FIG. 2 is a diagram of the network environment 200 (e.g., a telecommunication network such as, but not limited to, a wireless telecommunication network) according to an example embodiment. In the present embodiment, the network environment 200 includes the cell site 110, node management system 120, user device 130, and one or more target nodes 240, 250, and 260. Although some of the components in the network environment 200 are depicted as single components (e.g., a single cell site, user device, or node management system), in some embodiments, the network environment 200 may include a plurality of such components from 1 to N.

In some examples, the node management system 120 may send or otherwise transmit a measurement request to the user device 130. The measurement request may include a B1 measurement object that may request that the user device 130 measure the signal strength of one or more target nodes. The node management system 120 may be structured to receive one or more signal strengths. As used herein, the term "signal strength" may be used to refer to a measure of at least one of a Reference Signal Received Power (RSRP), Reference Signal Received Quality (RSRQ), Receive Strength Signal Indicator (RSSI), or any other signal measurement. Industry practice currently provides that RSRQ is measured in decibel (dB) and RSRP is measured in decibel relative to a milliwatt (dBm). For simplicity, RSRP will be used for the remainder of the disclosure for references to signal strength, but in no way should signal strength measurements be interpreted to be limited to just RSRP.

The node management system 120 may include one or nodes. For example, the node management system 120 may include or otherwise take the form of an Evolved Node B (e.g., eNodeB or eNB). In some embodiments, the node management system 120 may be included within the cell site 110, external to the cell site 110, or otherwise communicatively coupled to the cell site 110. The node management system 120 may allocate radio frequency, or a portion thereof, to user device(s). In further embodiments, the node management system 120 may be structured to manage the operation of one or more antennas (e.g., Multiple-Input Multiple-Output (MIMO) operations). Alternatively or additionally, the node management system 120 may manage the signaling (e.g., Orthogonal Frequency-Division Multiplexing (OFDM) signaling) within the network 200. The node management system 120 may manage a Radio Access Network (RAN) or any other suitable network.

In some embodiments, the node management system 120 may be communicatively coupled to the user device 130 such that the node management system 120 (e.g., eNodeB or eNB) may receive the one or more signal strengths from any user device within a geographic area. For example, the node management system 120 may receive one or more signal strengths reported by the user device 130. In this regard, the user device 130 may report signal strengths with RSRPs measuring −90 dBm, −93 dBm, and −94 dBm to the node management system 120. Alternatively or additionally, the node management system 120 (e.g., eNodeB) may retrieve one or more signal strengths from the user device 130. In some embodiments, the node management system 120 may identify the one or more signal strengths associated with one target node 240 or a plurality of target nodes 240, 250, and 260 within a geographic area.

A signal strength may be associated with a target node 240. Accordingly, one or more signal strengths may be associated with one or more target nodes 240, 250, and 260. A target node may include a secondary RAN node, secondary gNB, SgNB node, secondary node, or any other suitable node. For example, −90 dBm may be the signal strength (e.g., measured in RSRP) of the target node 240 (e.g., the target SgNB node). The signal strength −93 dBm may be the signal strength of the target node 250 and −94 dBm may be the signal strength of the target node 260.

In some embodiments, the one or more target nodes may correspond to one or more frequency bands. A frequency is the number of times per second that a radio wave completes a cycle. As used herein the term "frequency band" may be used to refer to a frequency range that includes a lower frequency and an upper frequency within which the user device 130 may connect to the network environment 200 such as, but not limited to, a telecommunication network or a portion thereof. The frequency range may be measured by the wavelength in the range. In this regard, for example, the target node 240 (e.g., target SgNB node) may correspond to the n260 frequency band with a frequency of 39 GHz. The target node 250 may correspond to the n41 frequency band with a frequency of 2500 MHz. The target node 260 may correspond to the n71 frequency band with a frequency of 600 MHz.

In some embodiments, the cell site 110 may be associated with one or more target nodes (e.g., one or more target SgNB nodes). For example, as depicted, the cell site 110 is associated with the target nodes 240, 250, and 260. Alternatively or additionally, one or more target nodes may be associated with a plurality of cell sites as described herein with reference to FIG. 3.

In some examples, the node management system 120 (e.g., the eNode B) may determine the one or more signal strengths are within a delta range threshold. The delta range threshold may be defined by an operator or generated by a system, component, or device local to or remote from the network environment 200. The delta range threshold may be 5 dB, 10 dB, or any other suitable threshold. In some embodiments, the node management system 120 may identify the one or more signal strengths associated with one or more target nodes 240, 250, and 260 within a geographic area. In turn, the node management system 120 may compare each of the signal strengths to determine which of the signal strengths are within the delta range threshold. For example, the node management system 120 (e.g., the eNode B) may compare the signal strengths with the RSRPs measuring −90 dBm, −93 dBm, and −94 dBm and determine that they are within the delta threshold range of 5 dB.

Responsive to determining that one more signal strengths associated with the target nodes 240, 250, and 260 are within a delta threshold range, the node management system 120 (e.g., the eNode B) may determine one or more multi-technology thresholds (e.g., B1 threshold(s)) associated with the one or more target nodes 240, 250, and 260. As used herein, the term "multi-technology threshold" may be used to refer to a threshold that is utilized during the mobility of the user device 130 to determine whether to connect the user device 130 to different cells, nodes, and/or technology (e.g., 4G, LTE, 5G, etc.). In this regard, the node management system 120 may check the multi-technology threshold (e.g., B1 threshold) settings of the target nodes (e.g., target SgNB nodes) reported by the user device 130. The node management system 120 may determine, for example, that the B1 threshold associated with the target node 240 is −93 dBm. In further examples, the node management system 120 may determine the B1 threshold associated with the target node 250 is −115 dBm and the B1 threshold associated with the target node 260 is −121 dBm.

The multi-technology thresholds (e.g., B1 threshold(s)) for each frequency band may be set to support the network environment 200. For example, the multi-technology thresholds for each frequency band may be set to support a telecommunication network (e.g., an EN-DC 5GNR NSA network). In some embodiments, a multi-technology threshold may be set based on one or more parameters such as, but not limited to, the frequency band and/or channel bandwidth.

In some embodiments, the node management system 120 (e.g., the eNode B) may determine the lowest multi-technology threshold (e.g., the lowest B1 threshold) based on the magnitude of the one or more multi-technology thresholds (e.g., B1 threshold(s)) determined. Continuing with the example above, the node management system 120 (e.g., the eNode B) may identify the lowest multi-technology threshold based on the magnitude of the one or more multi-technology thresholds (e.g., −93 dBm, −115 dBm, and −121 dBm) associated with the target node(s) reported by the user device 130. Accordingly, the node management system 120 may determine the B1 threshold with a magnitude of −121 dBm associated with the target node 260 is the lowest B1 threshold as compared to the magnitude of the B1 threshold(s) associated with target nodes 240 and 250.

In some embodiments, the node management system 120 may assign the user device 130 to the target node associated with the lowest multi-technology threshold determined. The assignment (e.g., the selection) of the target node (e.g., the target SgNB node) may be based on the magnitude of the multi-technology threshold set (e.g., the lowest multi-technology threshold). In some examples, the assignment of the target node may be based on a plurality of selection parameters that may include the magnitude of the multi-technology threshold, the signal strength (e.g., the RSRP), or any other suitable selection parameter. The node management system 120 (e.g., the eNodeB) then prioritizes and, in turn, assigns the user device 130 to the target node associated with the lowest multi-technology threshold (e.g., the target node 260 that has the B1 threshold of −121 dBm) as compared to the target node with higher multi-technology threshold (e.g., the target node 240 with the B1 threshold of −90 dBm).

Advantageously, assigning the user device 130 to the target node selected based on the magnitude of the multi-technology threshold increases the geographic area in which the user device may operate in a mobile state (e.g., a state in which the user device moves across, within, or external to a network) without the possibility of disruption such as without the need for a handoff event. For example, assigning the user device to the target node selected based on the magnitude of the multi-technology threshold prevents the need to re-initialize or otherwise identify another target node and handoff the user device to that target node when the user device moves between point A and B or otherwise within the geographic area of the target node 260. The target node 260 covers more area than the target nodes 240 and 250 such that selection of the target node based on the magnitude of the multi-technology threshold (e.g., the B1 threshold) extends the coverage of the telecommunication network (e.g., a 5G New Radio network or any other suitable network).

Figure 3:
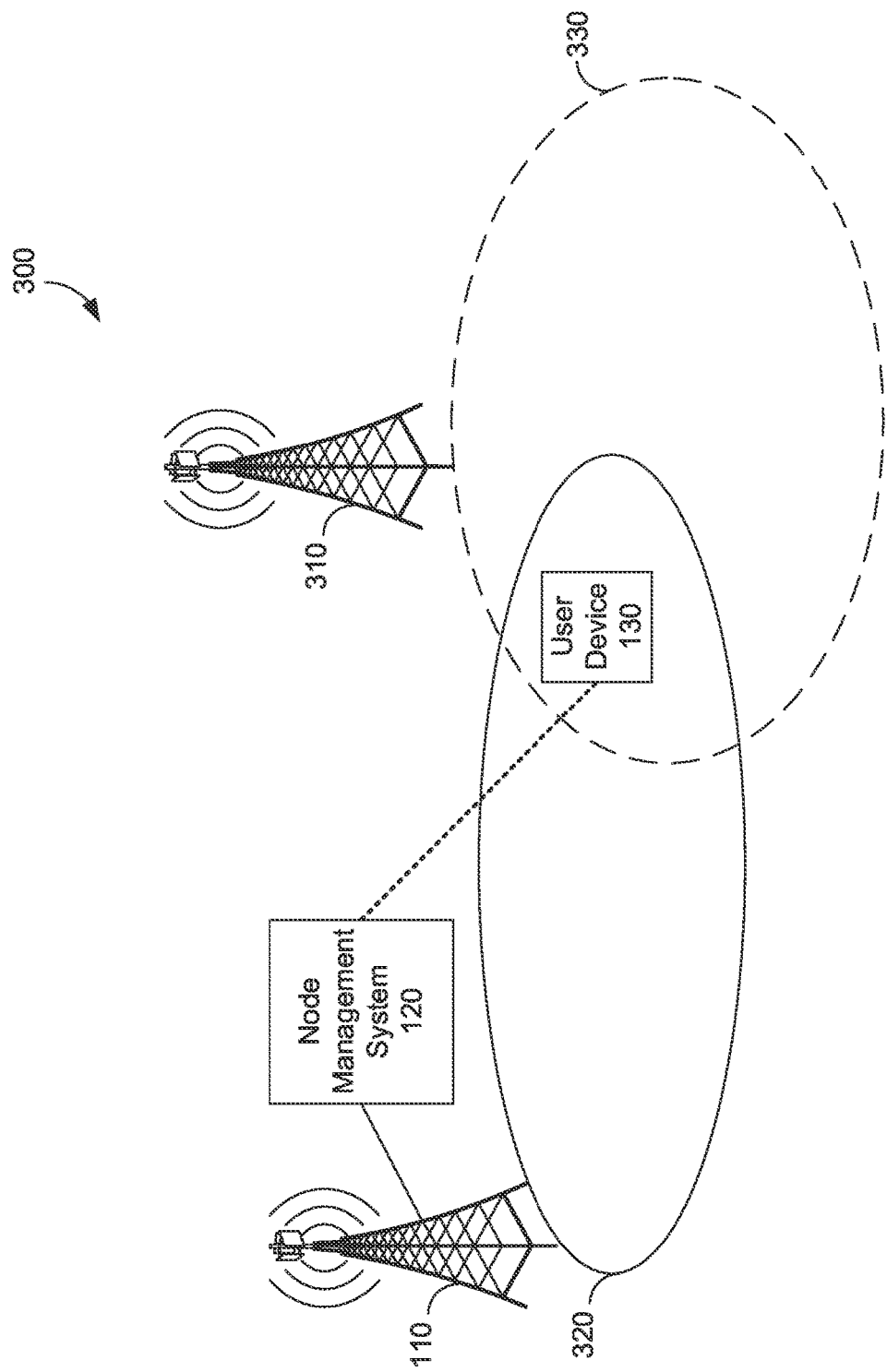
FIG. 3 is a diagram of a network environment including a plurality of cell sites and a node management system in accordance with an example embodiment.

FIG. 3 is a diagram of the network environment 300 (e.g., a telecommunication network such as, but not limited to, a wireless telecommunication network) according to an example embodiment. In the present embodiment, the network environment 300 includes the cell site 110, cell site 310, node management system 120, user device 130, and one or more target nodes 320 and 330. Although some of the components in the network environment 300 are depicted as single components (e.g., a single user device or node management system), in some embodiments, the network environment 300 may include a plurality of such components from 1 to N.

In some examples, the node management system 120 may be structured to receive one or more signal strengths (e.g., the RSRP) associated with one or more target nodes. As depicted, the signal strengths associated with the target nodes 320 and 330 may be received by the node management system 120. In some embodiments the first cell site 110 may include the node management system 120. The node management system 120 may be communicatively coupled to the user device 130 such that the node management system 120 (e.g., eNodeB or eNB) may receive the signal strengths reported by the user device 130 that are associated with the target nodes 320 and 330. For example, the user device 130 may report a signal strength associated with the target node 320 that measures a RSRP of −78 dBm and a signal strength associated with the target node 330 that measures a RSRP of −81 dBm to the node management system 120.

In some embodiments, the one or more target nodes may correspond to one or more secondary cell sites. For example, the target node 330 may correspond to the secondary cell site 310. The secondary cell site 310 may include one or more amplifiers, antennas, base transmitter stations, radios, transmitter/receivers, digital signal processors, control electronics, GPS equipment, power cabinets or power supply, base stations, charging stations, etc. such that the cell site 310 may provide a communication link between one or more user devices and other components, systems, equipment, and/or devices of the network environment 300. The cell site 310 may be operable in a non-stand alone mode (e.g., operable in an EN-DC network) or in a stand alone mode (e.g., operable in a 5G network or any other suitable network).

The node management system 120 (e.g., the eNode B) may compare each of the signal strengths to determine which of the signal strengths are within the delta range threshold. In this regard, the node management system 120 may compare the signal strengths with the RSRPs measuring −78 dBm and −81 dBm. In turn, the node management system 120 may determine that they are within the delta threshold range of, for example, 5 dB.

In some examples, the node management system 120 (e.g., the eNode B) may determine one or more multi-technology thresholds (e.g., B1 threshold(s)) associated with the one or more target nodes 320 and 330 (e.g., target SgNB nodes). The node management system 120 may check the multi-technology threshold settings of the target nodes 320 and 330 reported by the user device 130. The node management system 120 may determine that the multi-technology threshold (e.g., B1 threshold) associated with the target node 320 is, for example, −100 dBm. In some embodiments, the node management system 120 may determine the multi-technology threshold associated with the target node 330 is −112 dBm.

The node management system 120 (e.g., the eNode B) may determine the lowest multi-technology threshold based on the magnitude of the multi-technology thresholds determined. Alternatively or additionally, the node management system 120 (e.g., the eNode B) may identify the lowest multi-technology threshold (e.g., the lowest B1 threshold) based on the magnitude of the one or more multi-technology thresholds (e.g., B1 threshold(s)) (e.g., −100 dBm and −112 dBm) associated with the target nodes 320 and 330 reported by the user device 130. The multi-technology threshold that has a magnitude of −112 dBm associated with the target node 330 may be determined by the node management system 120 to be the lowest multi-technology threshold in comparison to the magnitude of −100 dBm of the multi-technology threshold associated with the target node 320.

The node management system 120 may assign the user device 130 to the target node associated with the lowest multi-technology threshold determined. For example, the node management system 120 may assign the user device 130 to the target node 330 that has the lowest multi-technology threshold of −112 dBm. The target node assigned may be correspond to the first cell site (e.g., the cell site 110) associated with the node management system 120. Alternatively or additionally, the target node assigned may be associated with a secondary cell site (e.g., the secondary cell site 310).

Figure 4:
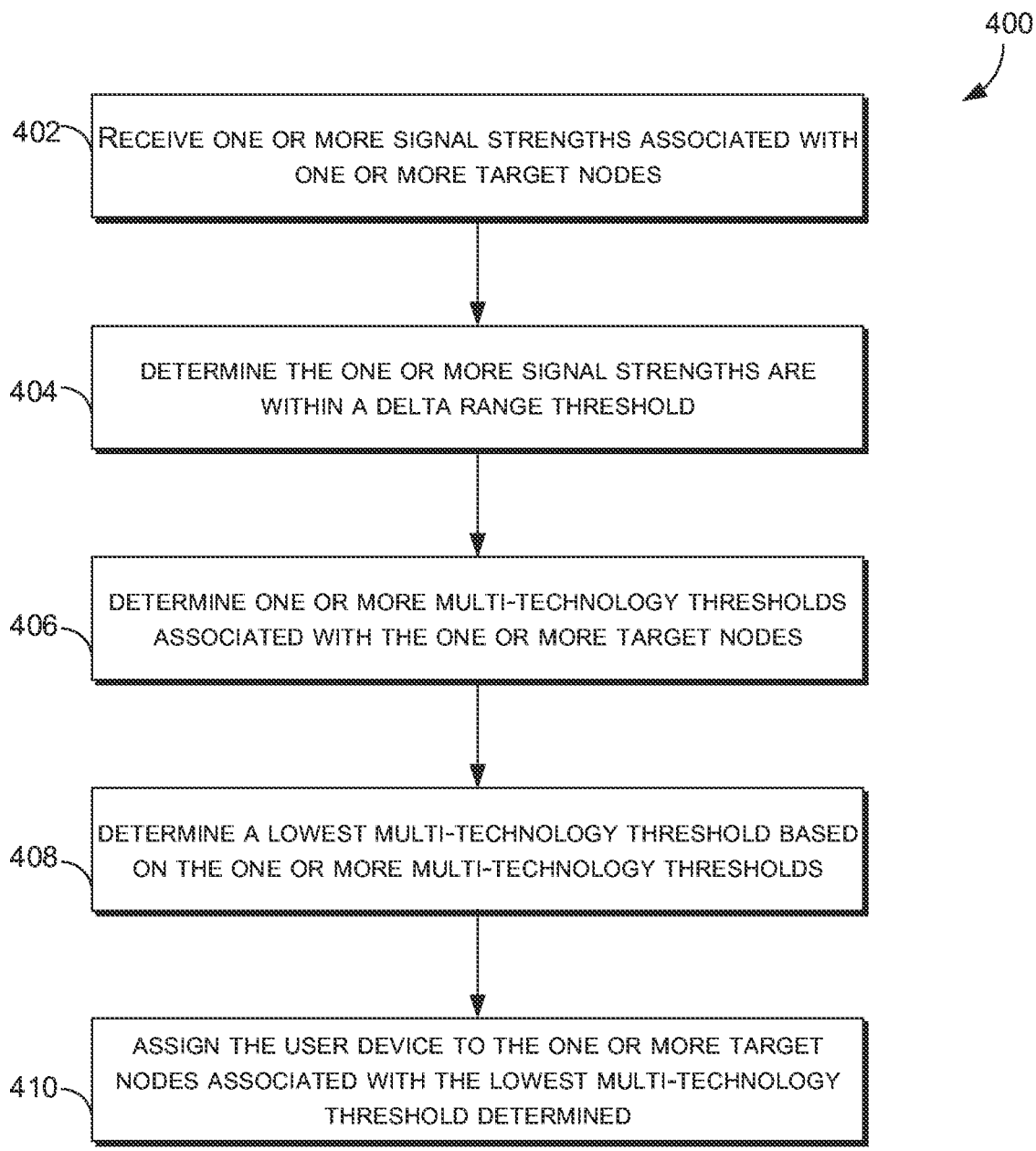
FIG. 4 depicts a flowchart of an exemplary method for extending coverage of a telecommunication network in accordance with an example embodiment.

FIG. 4 depicts a flow diagram of an exemplary method 400 for extending coverage of a telecommunication network, in accordance with implementations of the present disclosure. Initially at block 402 one or more signal strengths associated with one or more target nodes are received by a node management system. The signal strength may be a measure of at least one of a RSRP, RSRQ, RSSI, or any other signal measurement. In some embodiments, the one or more target nodes may correspond to one or more frequency bands (e.g., a frequency range that includes a lower frequency and an upper frequency). The node management system may be communicatively coupled to one or more user devices such that the node management system receives the signal strength of each target node reported by the user device(s). In some embodiments, the node management system may receive the signal strength of each target node within a geographic region.

At block 404, the one or more signal strengths within a delta range threshold are determined by the node management system. The delta range threshold may be 5 dB, 10 dB, or any other suitable threshold. In some embodiments, the node management system 120 may identify the one or more signal strengths associated with one or more target nodes. The node management system may compare each of the signal strengths to determine which of the signal strengths are within the delta range threshold.

One or more multi-technology thresholds (e.g., B1 threshold(s)) associated with the one or more target nodes is determined at block 406. The node management system may check the multi-technology threshold settings of the target nodes (e.g., target SgNB nodes) reported by the user device.

At block 408, the lowest multi-technology threshold is determined based on the one or more multi-technology thresholds. The node management system (e.g., the eNode B) may determine the lowest multi-technology threshold (e.g., the lowest B1 threshold) based on the magnitude of the one or more multi-technology thresholds determined. Accordingly, the node management system may compare the magnitude of the multi-technology threshold(s) associated with the target node(s). In some embodiments, the node management system may identify the lowest multi-technology threshold based on which multi-technology threshold has the lowest magnitude among each of the multi-technology thresholds determined.

At block 410, the user device is assigned to the target node associated with the lowest multi-technology threshold determined. In this regard, the node management system may prioritize the target node associated with the lowest multi-technology threshold. The user device may then be assigned to the target node(s) associated with the lowest multi-technology threshold. The target node assigned may correspond to the first cell site associated with the node management system. In some examples, the target node assigned may be associated with a secondary cell site.

Figure 5:
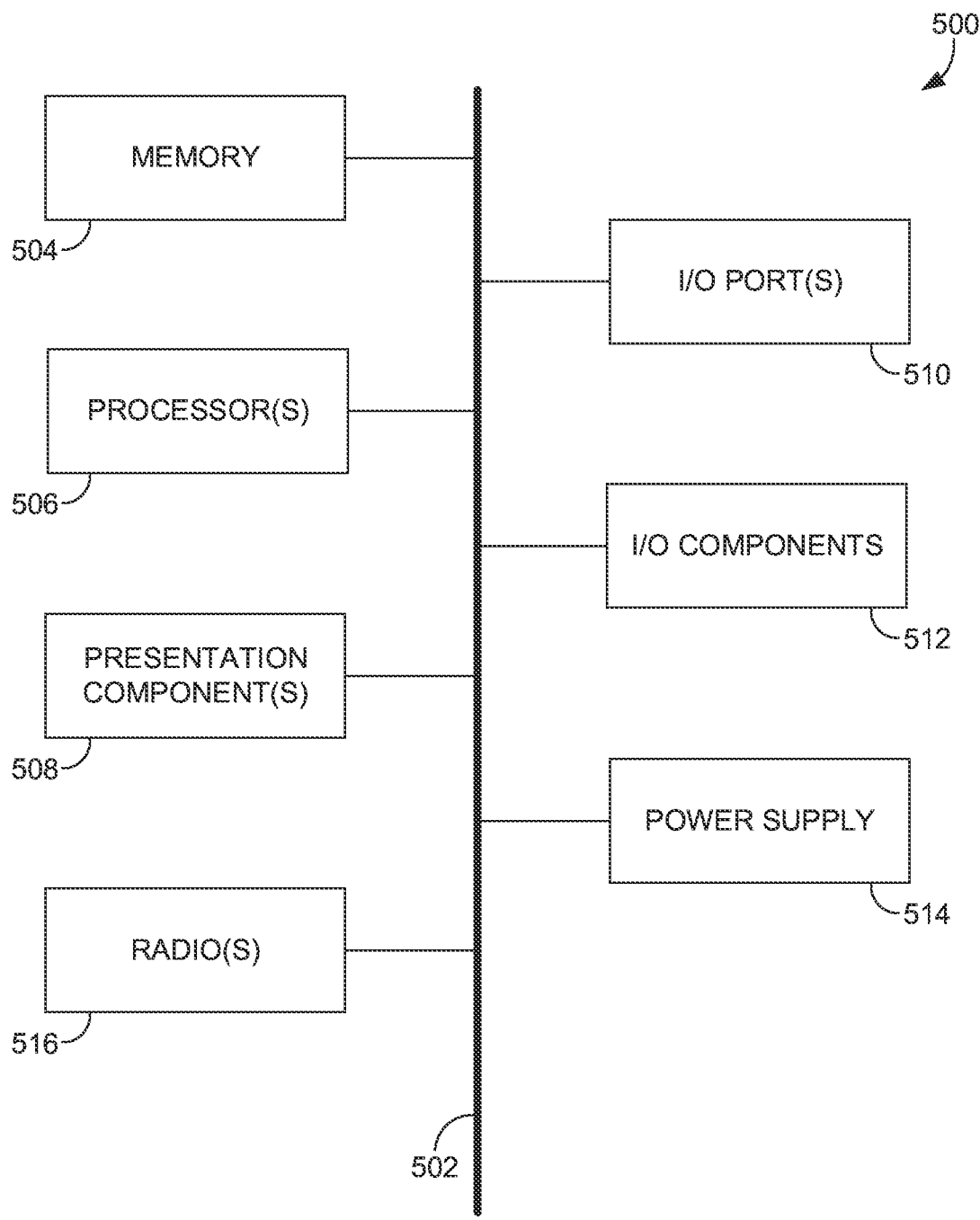
FIG. 5 depicts an exemplary computing device suitable for use in implementations of aspects herein.

Referring to FIG. 5, a block diagram of an example of a computing device 500 suitable for use in implementations of the technology described herein is provided. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated. In aspects, the computing device 500 may be a base station. In another embodiment, the computing device 500 may be UE capable of two-way wireless communications with an access point. Some non-limiting examples of the computing device 500 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 5, computing device 500 includes a bus 502 that directly or indirectly couples various components together. The bus 502 may directly or indirectly one or more of memory 504, processor(s) 506, presentation component(s) 508 (if applicable), radio(s) 510, input/output (I/O) port(s) 512, input/output (I/O) component(s) 514, power supply 516, and/or transmitter(s) 518. Although the components of FIG. 5 are shown with lines for the sake of clarity, in reality, delineating various components is not so clear, and metaphorically, the lines would more accurately be grey and fuzzy. For example, one may consider a presentation component(s) 508 such as a display device to be one of I/O components 514. Also, the processor(s) 506 may include memory 504, in another example. The present disclosure hereof recognizes that such is the nature of the art, and reiterates that FIG. 5 is merely illustrative of an example of a computing device 500 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 504 may take the form of memory components described herein. Thus, further elaboration will not be provided here, but it should be noted that memory 504 may include any type of tangible medium that is capable of storing information, such as a database or data store. A database or data store may be any collection of records, files, or information encoded as electronic data and stored in memory 504, for example. In one embodiment, memory 504 may include a set of embodied computer-readable and executable instructions that, when executed, facilitate various functions or elements disclosed herein. These embodied instructions will variously be referred to as "instructions" or an "application" for short.

Processor(s) 506 may be multiple processors that receive instructions and process them accordingly. Presentation component(s) 508, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 510 represents one or more radios that facilitate communication with a wireless telecommunication network. For example, radio(s) 510 may be connected to one or more antenna elements through a physical path. Illustrative wireless telecommunications technologies include CDMA, GPRS, TDMA, GSM, and the like. Radio(s) 510 might additionally or alternatively facilitate other types of wireless communications including Wi-Fi, WiMAX, 4G, 3G, 4G, LTE, mMIMO, 5G, NR, VoLTE, and/or other VoIP communications. As can be appreciated, in various embodiments, radio(s) 510 may be configured to concurrently support multiple technologies, as previously discussed herein. As such, each of many radio(s) 510 may be used to separately control portions of an antenna array, for example, where at least one portion utilizes a distinct technology relative to another portion in the same antenna array or at the same base station or cell site. A wireless telecommunication network might include an array of devices, which are not shown so as to not obscure more relevant aspects of the invention. Components such as a base station, a communications tower, or even access points (as well as other components) can provide wireless connectivity in some embodiments.

The input/output (I/O) ports 512 may take a variety of forms. Exemplary I/O ports 512 may include a USB jack, a stereo jack, an infrared port, a firewire port, other proprietary communications ports, and the like. Input/output (I/O) components 514 may comprise keyboards, microphones, speakers, touchscreens, and/or any other item usable to directly or indirectly input data into the computing device 500.

Power supply 516 may include batteries, fuel cells, and/or any other component that may act as a power source to supply power to the computing device 500 or to other network components, including through one or more electrical connections or couplings. Power supply 516 may be configured to selectively supply power to different components independently and/or concurrently.

Finally, regarding FIGS. 1 through 5, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and subcombinations are of utility and may be employed without reference to other features and subcombinations and are contemplated within the scope of the claims.

The invention claimed is:

1. A system for extending coverage of a telecommunication network, the system comprising:
   a first node;
   a second node; and
   a node management module communicatively coupled to a user device, the node management module configured to:
   determine a first multi-technology threshold associated with the first node;
   determine a second multi-technology threshold associated with the second node;
   determine a lowest multi-technology threshold based on the first and the second multi-technology thresholds; and
   assign the user device to the second node based on the determination that the second node has the lowest multi-technology threshold.

2. The system of claim 1, wherein the first node is a different radio access technology than the second node.

3. The system of claim 1, wherein the first node and the second node comprise non-standalone 5G.

4. The system of claim 1, further comprising the node management module receiving one or more signal strengths associated with the first node and the second node.

5. The system of claim 4, wherein the one or more signal strengths are within a delta range threshold.

6. The system of claim 1, wherein the first node and the second node are associated with a cell site or a plurality of cell sites.

7. The system of claim 1, wherein the first node and the second node correspond to one or more frequency bands, and further comprising one or more signal strengths comprising a measure of at least one of a reference signal received power (RSRP), reference signal received quality (RSRQ), or receive strength signal indicator (RSSI).

8. The system of claim 1, wherein the node management module comprises an evolved node B.

9. A system for extending coverage of a telecommunication network, the system comprising:
   one or more receivers; and
   one or more computer processing components configured to perform operations comprising:
      reporting signal strength of two or more target nodes having unique cell identifiers;
      receiving a multi-technology threshold associated with each of the two or more target nodes;
      determining a first node of the two or more target nodes has a lowest multi-technology threshold; and
      attaching to the first node based on said determination associated with the lowest multi-technology threshold determined.

10. The system of claim 9, wherein the multi-technology threshold is set based on at least one of a frequency band or channel bandwidth.

11. The system of claim 9, wherein the signal strength is within a delta range threshold.

12. The system of claim 9, wherein the two or more target nodes comprise non-standalone 5G.

13. A method for extending coverage of a telecommunication network, the method comprising:
   reporting signal strength of two or more target nodes having unique cell identifiers;
   receiving a multi-technology threshold associated with each of the two or more target nodes;
   determining a first node of the two or more target nodes has a lowest multi-technology threshold; and
   attaching to the first node based on said determination associated with the lowest multi-technology threshold determined.

14. The method of claim 13, wherein the two or more target nodes corresponds to one or more frequency bands, and wherein the signal strength comprises a measure of at least one of a reference signal received power (RSRP), reference signal received quality (RSRQ), or receive strength signal indicator (RSSI).

15. The method of claim 13, wherein the two or more target nodes are associated with a cell site or a plurality of cell sites.

16. The method of claim 15, wherein a telecommunication network comprises the cell site, and wherein the telecommunication network is operable in a non-standalone mode or standalone mode.

17. The method of claim 16, wherein the telecommunication network comprises an E-UTRAN New Radio-Dual Connectivity (EN-DC) network.

18. The method of claim 13, further comprising a node management system that comprises a master node, and wherein the master node is communicatively coupled to a user device.

19. The method of claim 13, wherein the multi-technology threshold is set based on at least one of a frequency band or channel bandwidth.

20. The method of claim 13, wherein the signal strength is within a delta range threshold.

\* \* \* \* \*